Patented June 26, 1934

1,964,322

UNITED STATES PATENT OFFICE

1,964,322

ELECTRICALLY CONDUCTING COATING ON VITREOUS SUBSTANCES AND METHOD OF PRODUCING IT

James Franklin Hyde, Corning, N. Y., assignor to Corning Glass Works, Corning, N. Y., a corporation of New York No Drawing. Application November 7, 1930, Serial No. 494,203

11 Claims. (Cl. 91—70.1)

This invention relates to a method of treating the surface of glass or other vitreous substances to produce thereon an electrically conducting coating or film.

The chief method of producing such films heretofore has been by the chemical reduction of metallic salt solutions whereby a metallic mirror is deposited, as in the well know silvering process. Such coatings are not particularly adherent and may be scraped off or dissolved off with acids. Furthermore, such metallic coatings must be relatively thick in order to be continuous and hence conducting.

It is the object of this invention to produce on glass or other vitreous substances an exceedingly thin coating or film which possesses the property of electrical conductivity, which will be in intimate contact with the glass and which will retain these properties under adverse conditions.

I have discovered that when silicon tetrachloride is vaporized onto the surface of hot glass under reducing conditions, a thin film is produced thereon which has good conducting properties. This is particularly surprising in view of the fact that silicon tetrachloride itself is non-conducting and silicon dioxide into which silicon tetrachloride is converted on decomposition is also non-conducting. This film is iridescent in appearance and is so strongly attached to the surface of the glass that it can not be rubbed or scraped off and resists the attack of all common acids. Hydrofluoric acid, although it does not dissolve the film, dissolves the glass beneath and thus loosens the film.

In practicing my invention I heat the glass to a temperature of approximately 200 to 400° C. and expose it to the vapor of silicon tetrachloride until a strongly iridescent coat is obtained. On account of the ease with which silicon tetrachloride produces iridescence on glass, it requires but a few seconds to obtain this coating. Since silicon tetrachloride is not only quite volatile but is readily hydrolyzed by moist air, the most effective way of obtaining the vapor is to pass a stream of dried air through liquid silicon tetrachloride contained in a closed vessel and to conduct the vapor from the vessel by means of a delivery tube. In this way the vapor may conveniently be directed against the article which is to be coated. Heat may be applied to the vessel to promote vaporization. The iridescent film which is thus obtained on the glass is non-conducting regardless of its thickness but I have discovered that I can make it conducting by reheating the article in a reducing atmosphere. Consequently, after I have obtained a suitable iridescent coating on glass, I reheat the glass to a temperature of approximately 200 to 400° C. in a reducing gas flame such as the inner cone of the flame of a Bunsen burner, whereupon the iridescent appearance of the film becomes more pronounced and the film becomes conducting. Silicon tetrachloride when used as above described will produce conducting films on a variety of vitreous substances and I have successfully applied such films to glass, glazed porcelain, unglazed porcelain, fused silica, etc.

I have found that films can be produced at any temperature from room temperature up to the softening point of the glass and in carrying out my invention I prefer to use a temperature of approximately 200 to 400° C. as being apparently the most suitable temperature for producing conducting films.

Films produced at room temperature are exceedingly thin and are easily rubbed off or washed off with water but if heated in a reducing flame as above described, they become firmly attached to the glass and resist abrasion or the attack of acids. However, I have been unable to obtain conductivity in films prepared at room temperature which is probably due to the extreme thinness of the film.

On the other hand, the films produced on glass which has been heated above 200° C. and even to its softening point readily become conducting when reheated in the reducing flame.

Subsequent harsh treatment of films which have been rendered conducting, such as washing, scraping, heating to the melting point of the glass, etc., does not destroy the conductivity. However, if a conducting film be covered over by re-iridization with a fresh film, no conductivity is then perceptible until the fresh film has been properly treated under reducing conditions as above described.

I have also found that I can produce conducting films with silicon tetrachloride in one step, that is, by initially applying the vapor to the hot glass in a reducing atmosphere such as, for example, by using a stream of dried illuminating gas in lieu of the dried air in the above described method. This method is not as satisfactory as the two-step method but it is to be understood that my invention includes all such means of applying silicon tetrachloride under reducing conditions.

Since silicon tetrachloride itself is non-conducting and is readily decomposed, it is unlikely that these conducting films are composed of silicon tetrachloride. My researches have shown that the conducting films produced by silicon tetrachloride are always iridescent but films which are iridescent are not always conducting and I believe that conductivity is due to some conducting compound of silicon which is present in the iridescent layer and which is produced only after the iridescent layer has been subjected to heating under reducing conditions.

I am also able to produce films of variable conductivity by proper manipulation of the vapor jet. Thus by allowing the jet of vapor to impinge on one spot a film is produced which after proper reduction varies uniformly in conductivity from the center, or point of impingement of the jet, to the outer edges of the film. In this case the conductivity is highest at the center of the film and least at the edges thereof. I believe this is due to variation in the thickness of the film and that the film becomes uniformly more thin as the edge is approached.

Having thus described my invention, what I claim and desire to secure by Letters Patent is:

1. The method of producing an electrically conducting coating on vitreous substances which includes treating the vitreous substance with the vapor of silicon tetrachloride and heating it under reducing conditions.

2. The method of producing an electrically conducting coating on vitreous substances which includes heating the vitreous substance and treating it under reducing conditions with the vapor of silicon tetrachloride.

3. The method of producing an electrically conducting coating on glass which includes heating the glass and treating it under reducing conditions with the vapor of silicon tetrachloride.

4. The method of producing an electrically conducting coating on vitreous substances which includes heating the vitreous substance to a temperature of at least 200° C. and treating it under reducing conditions with the vapor of silicon tetrachloride.

5. The method of producing an electrically conducting coating on glass which includes heating the glass, treating it with the vapor of silicon tetrachloride and then reheating the glass under reducing conditions.

6. The method of producing an electrically conducting coating on glass which includes heating the glass to a temperature of at least 200° C., treating it with the vapor of silicon tetrachloride, and reheating the treated glass to a temperature of at least 200° C. with a reducing flame.

7. The method of producing an electrically conducting coating on glass which includes repeatedly heating and treating the glass under reducing conditions with the vapor of silicon tetrachloride.

8. The method of producing an electrically conducting coating of variable conductivity on vitreous substances which includes heating the vitreous substance and treating it under reducing conditions with the vapor of silicon tetrachloride so as to form a coating of variable thickness on the surface of the vitreous substance.

9. The method of producing an electrically conducting coating of uniformly variable conductivity on vitreous substances which includes heating the vitreous substance and allowing silicon tetrachloride vapor to impinge at predetermined points on the surface thereof and subsequently reheating the vitreous substance under reducing conditions.

10. A vitreous article coated with an electrically conducting film obtained by treating the heated article with the vapor of silicon tetrachloride and heating it under reducing conditions.

11. A vitreous article coated with an electrically conducting film of variable conductivity obtained by treating the heated article with the vapor of silicon tetrachloride and heating it under reducing conditions.

JAMES FRANKLIN HYDE.